United States Patent Office 2,934,033
Patented Apr. 26, 1960

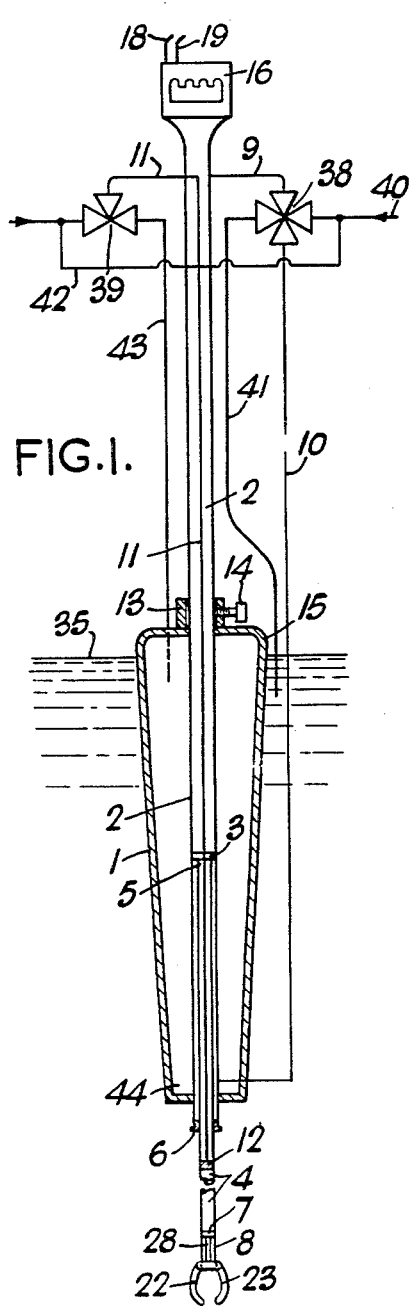
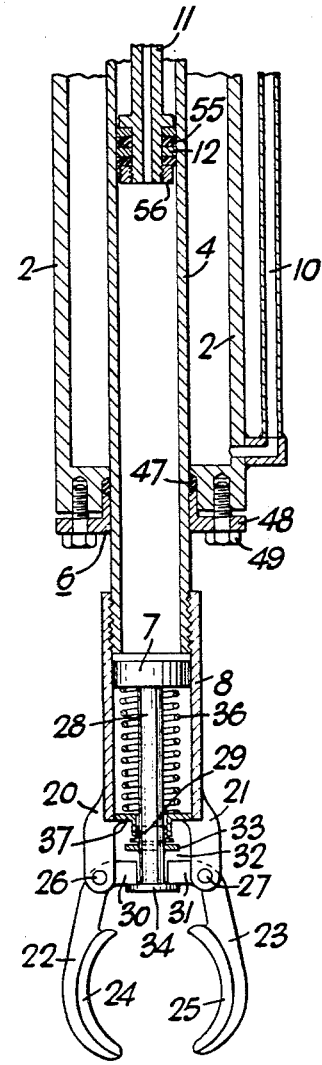
FIG.1.
FIG.3.

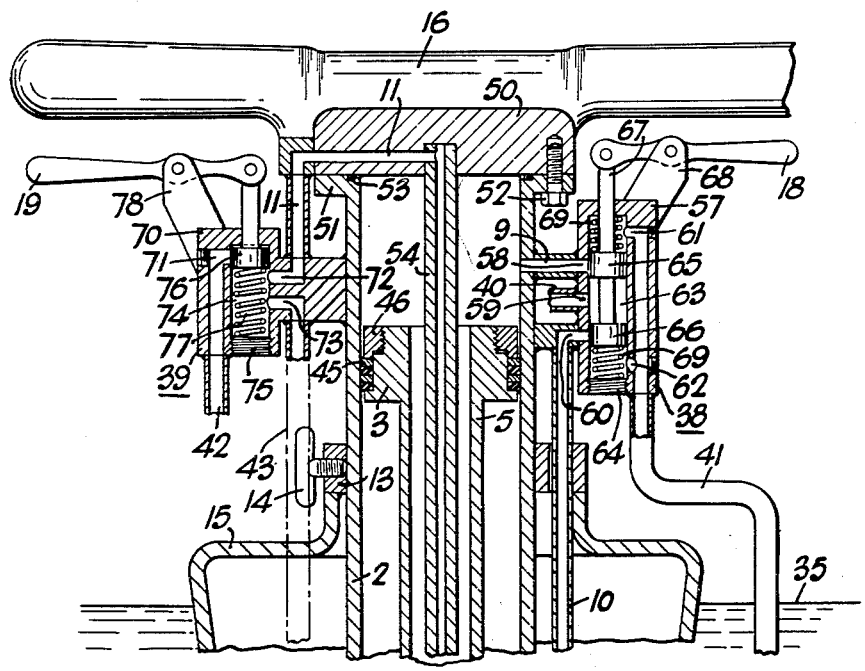
FIG.2.
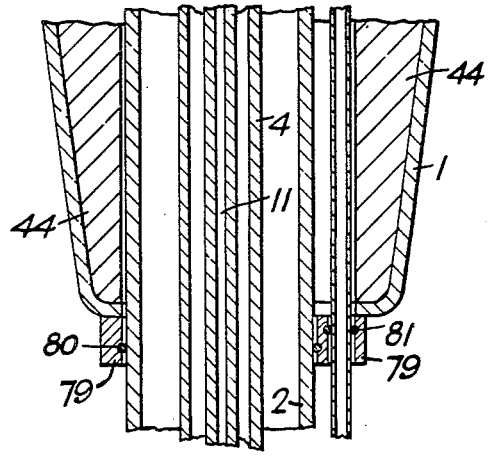

2,934,033

FLUID OPERATED PICK-UP MECHANISM FOR LIFTING AND TRANSPORTING ARTICLES UNDER WATER

Kenneth Henry Dent, Cuddington, near Northwich, and Herbert Chilvers Knights, Culcheth, Warrington, England, assignors to United Kingdom Atomic Energy Authority, London, England Application March 25, 1957, Serial No. 648,259

Claims priority, application Great Britain March 26, 1956

2 Claims. (Cl. 114—51)

This invention relates to fluid operated pick-up mechanisms, and it provides such a mechanism suitable for the manipulation of articles submerged under water.

A pick-up mechanism according to the invention comprises a float supporting the outer tube of a telescopic pair of tubes movable one within the other through a gland, a first plunger movable in the outer tube and coupled with the inner tube, a second plunger movable in the inner tube, a pick-up device attached to the part of the inner tube projecting from the outer tube, a coupling between the second plunger and the pick-up device so that the device can be operated by movement of the second plunger, fluid connections to the outer tube at points on both sides of the first plunger and a fluid connection to the inner tube for operating the second plunger passing inside the outer tube and thence through the first plunger and a gland between the fluid connection to the inner tube and the inner tube itself.

A pick-up mechanism will now be described by way of example with reference to the accompanying drawings, wherein Fig. 1 is a schematic view and Figs. 2 and 3 together make a sectional elevation, Fig. 2 being the top part and Fig. 3 the bottom part.

In the drawings a pick-up mechanism is shown having a float 1, an outer tube 2 extending through the float 1, a plunger 3 slidable in the tube 2 and an inner tube 4 coaxial with the tube 2. The tube 4 has an end 5 which is attached to the plunger 3, and a screwed end 8 which is outside the float 1, the tube 4 passing through the submereged part of the float at a gland 6. A plunger 7 is contained within the end 8 and is connected to open tongs in a manner to be described below. A pipe 9 connects with the tube 2 above the plunger 3 and a pipe 10 connects with the tube 2 below the plunger 3. A pipe 11 is provided to the inner tube 4 through a gland 12.

The float 1 is in the form of an inverted frustrum of a cone of small apex angle and is slidably mounted on the tube 2. The float has a clamping ring 13 with a clamping handle 14 at the upper end 15 of the float. The end 8 of the tube 4 carries a pair of fixed arms 20 and 21 and a pair of tong jaws 22 and 23 in the form of bell cranks with curved jaw faces 24 and 25. The jaws 22 and 23 are pivoted on the arms 20 and 21 respectively by pivot pins 26 and 27. The plunger 7 is attached to a rod 28 which extends from the tube 4 through a bearing 29 in the end 8 of the tube 4. The rod 28 carries two rings 33, 34, defining an annular channel 32 in which the ends 30 and 31 of the tong jaws rest. A compression spring 36 is provided between the plunger 7 and an end disc 37 secured to the end 8 of the tube 4.

A four-way three-position valve 38, and a three-way two-position valve 39 are carried on an operating handle 16 at the upper end of the tube 2. The four-way valve 38 is operated by means of a trigger 18 and the three way valve 39 by a trigger 19 on the operating handle 16. The valve 38 has connected with it pipes 9 and 10 referred to above and pipes 40 and 41. The pipe 40 connects a hydraulic supply to the valve 38 and the pipe 41 connects the valve 38 to exhaust below a water level 35. The valve 39 has three pipes 11, 42, 43 connecting with it. The pipe 11 has been referred to above. The pipe 42 connects the valve 39 with the hydraulic supply through the pipe 40 and the pipe 43 connects the valve 39 to exhaust below the water level 35. The float 1 has weights 44 at its lower end so that it floats in an upright position immersed to the level of the line 35 when the tube 4 is retracted inside the outer tube 2.

The plunger 3 has alternate rubber and metal piston rings 45 retained by a collar 46 screwed on the plunger 3. The gland 6 comprises a rubber sealing ring 47 located by a flanged sleeve 48 fixed to the tube 2 by bolts 49. The tube 2 is closed at the other end by a plate 50 fixed to the tube 2 at an external flange 51 by bolts 52 and sealed to the flange 51 by a sealing ring 53. The operating handle 16 is formed integral with the plate 50 which is drilled to accommodate a part 54 of the pipe 11. The gland 12 is fitted with alternate rubber and metal piston rings 55 retained by a collar 56.

The four-way valve 38 is welded to the tube 2 and comprises a body 57 having five ports 58, 59, 60, 61 and 62 connecting with a cylinder 63 drilled in the body 57 and closed by a screw plug 64. Two spaced pistons 65 and 66 mounted on a common piston rod 67 are movable in the cylinder 63 by the trigger 18 pivoted between lugs 68 on the body 57. The pistons 65 and 66 are spring loaded against movement in either direction in the cylinder 63 by compression springs 69. The pistons 65 and 66 normally cover the ports 58 and 60 which are respectively connected to pipes 9 and 10. The port 59 is connected with the hydraulic supply pipe 40, and the ports 61 and 62 are connected to the exhaust pipe 41.

The three-way slide valve 39 is also welded to the tube 2 and comprises a body 70 having three ports 71, 72 and 73 connecting with a cylinder 74 drilled in the body 70 and closed by a screw plug 75. A piston 76 loaded by a compression spring 77 is movable in the cylinder 74 by means of the trigger 19 pivoted between lugs 78 on the body 70. The piston 76 normally covers the port 71 which connects with the hydraulic supply through the pipe 42. The port 72 connects with the pipe 11. The port 73 is connected to exhaust by the pipe 43. The float 1 has at its lower end a boss 79 which seals with the pipe 2 over a ring 80 and with the pipe 10 over a ring 81.

The operation of the mechanism described above will now be described with reference to the pick-up of a cylindrical fuel element from the bottom of a storage pond starting with the telescopic arrangement of tubes 2 and 4 in the closed position (as shown in Figs. 2 and 3). The operating position of the handle 16 relative to the float 1 is preset to its optimum working position and locked by operating the clamping ring 13 and handle 14. The mechanism is moved by the handle 16 to a position near to the fuel element which is to be picked up. The trigger 19 of the valve 39 is lifted (i.e. piston 76 is depressed) to connect the hydraulic supply at pipe 42 to pipe 11 via ports 71, 72 so that the plunger 7 is depressed against the action of the compression spring 36 and the tong jaws 22 and 23 are opened by the ring 33 of the rod 28 which presses on the ends 30 and 31 of the jaws. The trigger 18 of the four-way valve 38 is now depressed (i.e. pistons 65, 66 rise) which connects the hydraulic supply pipe 40 to the pipe 9 and connects the pipe 10 to the exhaust pipe 41. Thus the hydraulic supply is connected to the tube 2 on the side of the plunger 3 remote from the gland 6 and the annular space between the tubes 2 and 4 is connected to the exhaust pipe 41 and the tube 4 is moved towards the fuel element lying on the bottom of the pond by the action of the pressurized hydraulic supply on the plunger 3.

Fluid contained in the annular space between tube 2 and 4 is forced out through pipe 10 and ports 60, 62 to the exhaust. The tube 4 is allowed to travel outwards and the direction of travel is adjusted by location of the mechanism until the tong jaws are situated with the fuel element between them. The tube 4 is now held at this point by restoration of the trigger 18. The tong jaws 22, 23 are now closed around the fuel element by releasing the trigger 19 which opens the way for fluid in the tube 4 to exhaust itself through the pipe 11, ports 72 and 73 in the valve 39 and exhaust pipe 43. Thus the pressure is released from the plunger 7. The plunger 7 moves under the action of the compression spring 36 and the jaws 22 and 23 are closed by the ring 34 of the rod 28 which presses on the ends 30 and 31 of the jaws and causes the jaws to be pivoted inwards. The jaws 22 and 23 are held in the closed position by the compression spring 36 until such time as the plunger is again subjected to the pressure of the hydraulic supply. The trigger 18 of the fourway valve 38 is now lifted (i.e. pistons 65, 66 are depressed) which connects the pipe 10 to the hydraulic supply pipe 40 and the pipe 9 to the exhaust pipe 41. Thus the annular space between the tubes 2 and 4 is connected to the hydraulic supply and the exhaust pipe 41 is connected to the tube 2 on the side of the plunger 3 remote from the gland 6. This causes the tube 4 to close into the tube 2 by the action of the pressurized hydraulic supply on the plunger 3 and the fuel element is thus picked up from the floor of the storage pond. The tube 4 is retracted a required amount then the trigger 18 is released to its original position so that the tube 4 is held. The mechanism is then manipulated to bring the fuel element to a required discharge point and the fuel element is discharged by depressing the trigger 19 so as to open the tong jaws 22 and 23.

I claim:

1. Fluid operated pick-up mechanism for lifting and transporting articles under water comprising in combination, a tubular stem, a member movable inside said stem, a fluid operated grab attached to said member and projecting beyond one end of said stem, a manipulating handle at the other end of said stem, a float secured to said stem to render the mechanism stably buoyant in water with the fluid operated grab below the water surface and the manipulating handle above the surface, means for moving said member including control means therefor, means for operating said grab including control means therefor, both of said control means being mounted in a position accessible to said manipulating handle.

2. Fluid operated pick-up mechanism as claimed in claim 1 where said float has adjusting means for securing it at various positions on said stem.

References Cited in the file of this patent

UNITED STATES PATENTS

| 1,304,012 | Bergeron | May 20, 1919 |
| 1,957,622 | Visnyei | May 8, 1934 |
| 2,372,347 | Watson | Mar. 27, 1945 |